(12) United States Patent
Iida

(10) Patent No.: US 7,190,845 B2
(45) Date of Patent: Mar. 13, 2007

(54) IMAGE CORRECTION ACCORDING TO TRANSMISSION CHARACTERISTICS OF IMAGE SENSING OPTICAL SYSTEM

(75) Inventor: Seiji Iida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 864 days.

(21) Appl. No.: 10/395,361

(22) Filed: Mar. 24, 2003

(65) Prior Publication Data

US 2003/0194143 A1    Oct. 16, 2003

(30) Foreign Application Priority Data

Mar. 27, 2002  (JP) .............................. 2002-089766

(51) Int. Cl.
- G06K 9/40 (2006.01)
- G06K 9/32 (2006.01)
- H04N 17/00 (2006.01)
- H04N 17/02 (2006.01)

(52) U.S. Cl. ...................... 382/274; 382/295; 348/180

(58) Field of Classification Search ................ 382/274, 382/275, 254, 151, 152, 312, 293, 294, 295; 356/302; 359/196, 201; 348/94, 95, 135, 348/136, 180, 189, 190

See application file for complete search history.

(56) References Cited

U.S. PATENT DOCUMENTS

| | | | |
|---|---|---|---|
| 5,758,939 A | * | 6/1998 | Ochiai et al. .................. 353/25 |
| 2004/0027566 A1 | * | 2/2004 | Suzuki et al. ................ 356/302 |
| 2004/0032631 A1 | * | 2/2004 | Amada et al. .............. 359/204 |

* cited by examiner

*Primary Examiner*—Yon J. Couso
(74) *Attorney, Agent, or Firm*—Morgan & Finnegan, LLP

(57) ABSTRACT

In an image processing apparatus for processing an image sensed by an image sensing unit which includes an optical system and an image sensing element for converting a subject image formed by the optical system into an electric signal, a group of correction data, which is calculated on the basis of relative positional information of an optical axis of the optical system and a center of an effective range of the image sensing element, for correcting an image sensed by the image sensing unit is read out from a storage unit, and the image is corrected based upon the group of correction data read out from the storage unit. A minimum value of the group of correction data is associated with a position substantially coinciding with the optical axis position on the image sensing element or a position between the optical axis of the optical system and the center and closer to the optical axis.

30 Claims, 5 Drawing Sheets

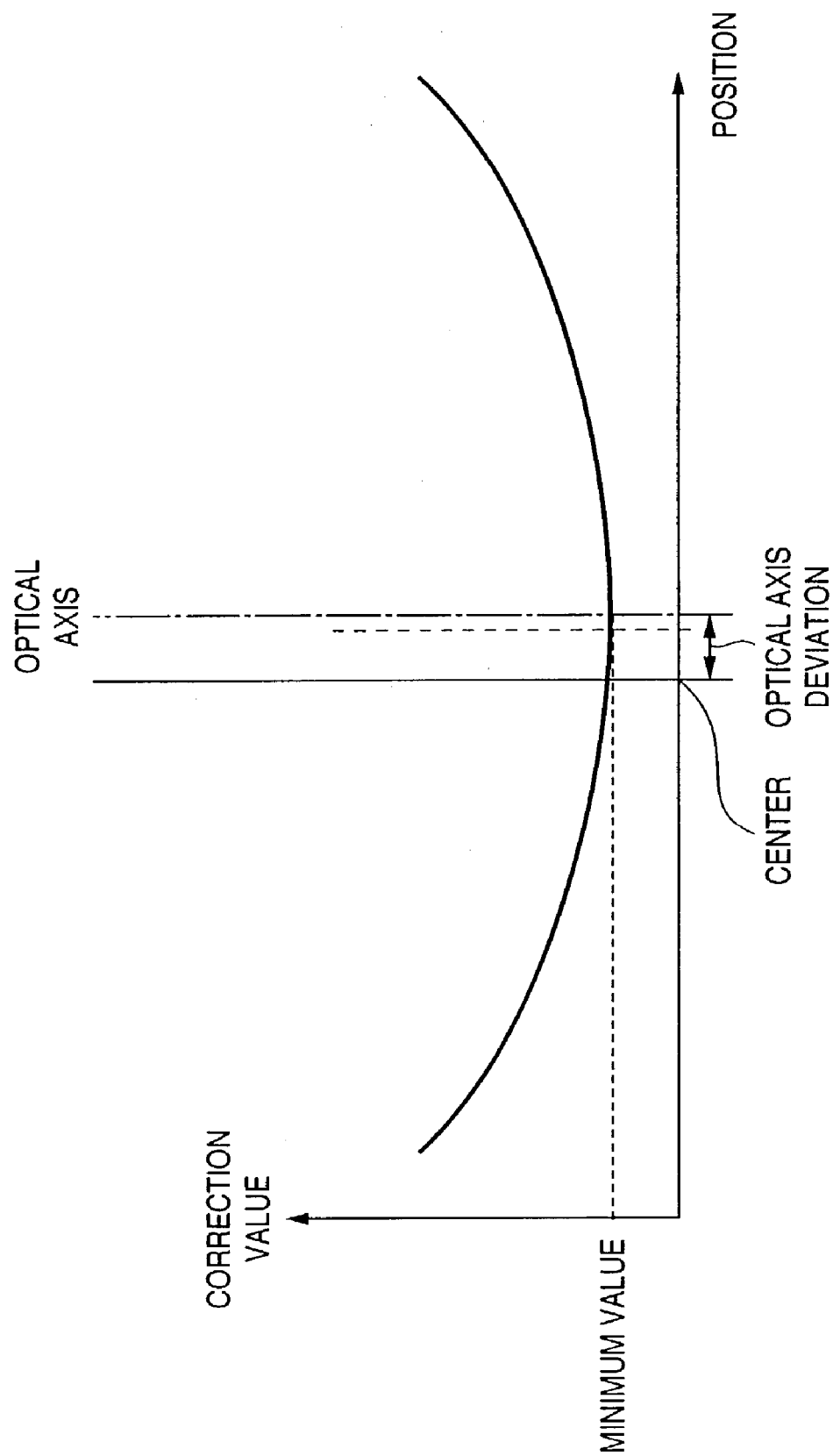

IMAGE CORRECTION ACCORDING TO TRANSMISSION CHARACTERISTICS OF IMAGE SENSING OPTICAL SYSTEM

FIELD OF THE INVENTION

The present invention relates to a technique for applying correction according to transmission characteristics of an image sensing optical system to an image sensed by an image sensing apparatus.

BACKGROUND OF THE INVENTION

It is known that a light amount (brightness) of a subject image, which is obtained by an image sensing optical system used in a camera which uses a silver halide film or an electronic camera, gradually decreases in proportion to the distance from an optical axis. This is called the limb darkening, which is inevitably caused by the cosine fourth power law, vignetting, or the like. An image sensed by an optical system with large limb darkening characteristic often becomes dark in its four corners and gives an unnatural impression.

In a conventional camera using a silver halide film, there is no other means but stopping down a lens, and/or adjusting exposure to light at the time of printing in accordance with exposure of a peripheral part of an image recorded on the film, for instance, for making limb darkening less conspicuous.

Moreover, in an actual optical system, it is inevitable that an optical axis of the optical system slightly deviates from a center of an image sensing element due to manufacturing errors. Since the center of the aforementioned limb darkening also becomes off the center of the image sensing element as the optical axis deviates from the center, darkening becomes intense in one corner on the image sensing element while darkening is eased in the other corner. In general, it is said that decrease in brightness toward the limb portion in a sensed image is less conspicuous when a decreasing rate is constant than when it is very large in one part while small in other part even if the difference between the light amounts at the central portion and the limb portion is the same. Since, in general, brightness drops rapidly outside an angle of view, off-centered limb darkening is extremely conspicuous and is likely to critically degrade quality of a photographed image.

In an image sensing apparatus using a photoelectric conversion image sensing element such as a CCD, which is represented by a digital camera, since a sensed image is recorded as numerical value data, a method for obtaining a satisfactory image by correcting the data is desired.

SUMMARY OF THE INVENTION

The present invention has been devised in view of the above situation, and it is an object of the present invention to obtain a preferable sensed image even in the case in which an optical axis deviates and the center of limb darkening shifts.

According to the present invention, the foregoing object is attained by providing an image processing apparatus for processing an image sensed by an image sensing unit which includes an optical system and an image sensing element for converting a subject image formed by the optical system into an electric signal, the image processing apparatus comprising: a storage unit adapted to store relative positional information of an optical axis of the optical system and a reference point of an effective range of the image sensing element and a function representing transmission characteristics of the optical system in advance; a correction value calculation unit adapted to calculate a correction value for correcting an image sensed by the image sensing unit using the relative positional information and the function; and an image correction unit adapted to correct the sensed image based upon the correction value.

According to the present invention, the foregoing object is also attained by providing an image processing apparatus for processing an image sensed by an image sensing unit which includes an optical system and an image sensing element for converting a subject image formed by the optical system into an electric signal, the image processing apparatus comprising: a storage unit adapted to store in advance a group of correction data, which is calculated on the basis of relative positional information of an optical axis of the optical system and a reference point of an effective range of the image sensing element, for correcting an image sensed by the image sensing unit; and an image correction unit adapted to correct the sensed image based upon the group of correction data.

Further, according to the present invention, the foregoing object is also attained by providing an image processing method for processing an image sensed by an image sensing unit which includes an optical system and an image sensing element for converting a subject image formed by the optical system into an electric signal, the image processing method comprising: reading relative positional information of an optical axis of the optical system and a reference point of an effective range of the image sensing element and a function representing transmission characteristics of the optical system from a storage unit; calculating a correction value for correcting an image sensed by the image sensing unit using the read relative positional information and the function; and correcting the image sensed by the image sensing unit based upon the correction value.

Further, according to the present invention, the foregoing object is also attained by providing an image processing method for processing an image sensed by an image sensing unit which includes an optical system and an image sensing element for converting a subject image formed by the optical system into an electric signal, the image processing method comprising: reading out a group of correction data, which is calculated on the basis of relative positional information of an optical axis of the optical system and a reference point of an effective range of the image sensing element, for correcting an image sensed by the image sensing unit from a storage unit; and correcting the image based upon the group of correction data read out from the storage unit.

Further, according to the present invention, the foregoing object is also attained by providing an image processing apparatus for processing an image sensed by an image sensing unit which includes an optical system and an image sensing element for converting a subject image formed by the optical system into an electric signal, the image processing apparatus comprising: an acquisition unit adapted to acquire positional deviation information in a manufacturing process between the optical system and the image sensing element; a storage unit adapted to store image correction values in advance; and an image correction unit adapted to correct the image based upon the positional deviation information in a manufacturing process and the image correction value.

Further, according to the present invention, the foregoing object is also attained by providing an image processing apparatus for processing an image sensed by an image sensing unit which includes an optical system and an image sensing element for converting a subject image formed by the optical system into an electric signal, the image processing apparatus comprising: a storage unit adapted to store correction values for correcting an image sensed by the image sensing unit calculated on the basis of positional deviation information in a manufacturing process between the optical system and the image sensing element; and an image correction unit adapted to correct the sensed image based upon the correction values.

Further, according to the present invention, the foregoing object is also attained by providing an image processing apparatus for processing an image sensed by an image sensing unit which includes an optical system and an image sensing element for converting a subject image formed by the optical system into an electric signal, the image processing apparatus comprising: a storage unit adapted to store a plurality of different correction values, corresponding to light amount of a subject, for correcting an image sensed by the image sensing unit on the basis of positional deviation information in a manufacturing process between the optical system and the image sensing element, wherein a position corresponding to a minimum value of the correction values in an effective range of the image sensing element is off the center of the effective range.

Further, according to the present invention, the foregoing object is also attained by providing an image processing apparatus for processing an image sensed by an image sensing unit which includes an optical system and an image sensing element for converting a subject image formed by the optical system into an electric signal, the image processing apparatus comprising: a storage unit adapted to store a first group of correction data for correcting an image sensed by the image sensing unit on the basis of positional deviation information in a manufacturing process between the optical system and the image sensing element; and a calculation unit adapted to calculate a plurality of second groups of correction data corresponding to a light amount of a object at a time of image sensing operation using the first group of correction data, wherein a position corresponding to a minimum value of the first group of correction data in an effective range of the image sensing element is off the center of the effective range.

According to the present invention, the foregoing object is also attained by providing an image sensing apparatus comprising: an image sensing unit including an optical system and an image sensing element for converting a subject image formed by said optical system into an electric signal; and any one of the image processing apparatuses as described above.

Further, according to the present invention, the foregoing object is also attained by providing an image processing method for processing an image sensed by an image sensing unit which includes an optical system and an image sensing element for converting a subject image formed by the optical system into an electric signal, the image processing method comprising: acquiring positional deviation information in a manufacturing process between the optical system and the image sensing element; storing image correction values in advance; and correcting the image based upon the positional deviation information in a manufacturing process and the image correction value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 5 is a graph showing correction data for correcting the peripheral light amount obtained using the reference lens with respect to potion on an image sensing element according to the embodiment of the present invention.

DETAILED DESCRIPTION OF THE PREFERRED EMBODIMENTS

A preferred embodiment of the present invention will be described in detail in accordance with the accompanying drawings.

Figure 1:
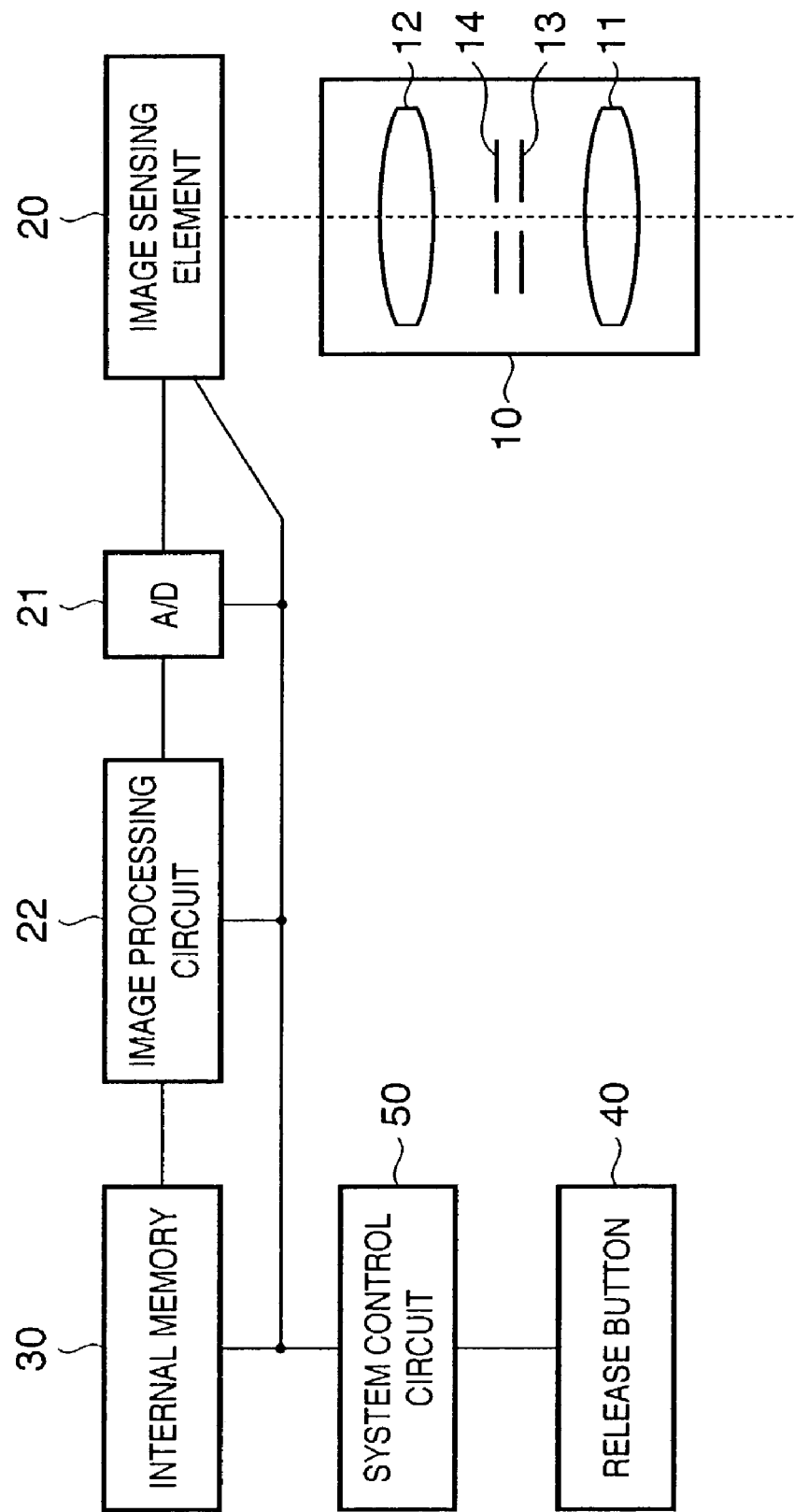
FIG. 1 is a block diagram showing a structure of an image sensing apparatus according to an embodiment of the present invention.

FIG. 1 is a block diagram showing a structure of an image sensing apparatus such as an electronic camera incorporating an image processing device of this embodiment. Reference numeral 10 denotes an image sensing optical system for forming a subject image, which includes a zoom lens 11 for controlling magnification, a focus lens 12 for controlling a focusing operation, a stop 13 for adjusting a light amount, a shutter 14, and the like. Reference numeral 20 denotes an image sensing element represented by a CCD, which converts an optical image incident thereon via the optical system 10 into an electric signal.

Reference numeral 21 denotes an A/D converter, which converts an analog signal outputted from the image sensing element 20 into a digital signal.

Reference numeral 22 denotes an image processing circuit, which applies predetermined pixel interpolation processing or color conversion processing to the digital signal outputted from the A/D converter 21. In addition, the image processing circuit 22 corrects an image sensed by the image sensing element 20 based upon a correction value which is calculated based upon a relative positional relationship between an optical axis of the optical system 10 and the center of an effective range of the image sensing element 20. Note that the relative positional relationship may be calculated based on the optical axis and an arbitrary reference point, instead of the center, of the effective range of the image sensing element 20.

Reference numeral 30 denotes an internal memory, in which data after processing in the image processing circuit 22 is recorded. In addition, a positional deviation direction and a deviation amount (distance) between the optical axis of the optical system 10 and the center of the effective range of the image sensing element 20 are stored in the internal memory 30. Further, a group of correction data for correcting limb darkening is also stored therein.

Reference numeral 40 denotes a release button for instructing start of an image sensing operation. Reference numeral 50 denotes a system control circuit for controlling the entire image sensing apparatus.

Next, a processing operation in the image sensing apparatus including the above-mentioned elements will be described with reference to a flowchart of FIG. 2. In response to pressing of the release button 40, focus adjustment, light amount adjustment, and opening of a shutter are performed (step S101).

When a subject image is formed on the image sensing element 20 via the optical system 10, a subject optical image is converted into an analog electric signal by the image sensing element 20 (step S102). Then, the analog signal of the image sensing element 20 is converted into a digital signal by the A/D converter 21 (step S103).

The digitized image data is subjected to interpolation processing and color conversion in the image processing circuit 22 (step S104).

Figure 3:
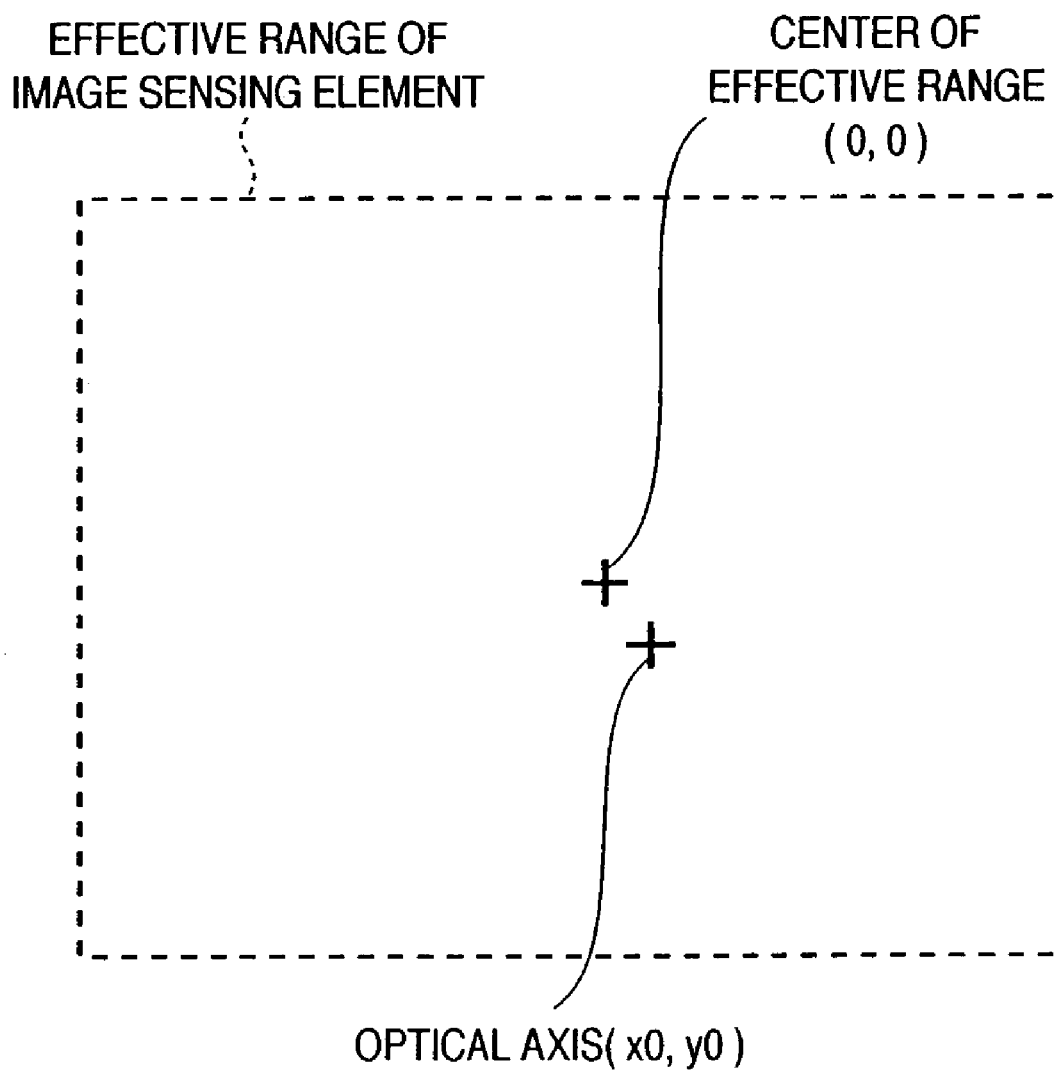
FIG. 3 is a schematic view showing a relative position of an optical axis and a center of an effective range of an image sensing element.

In addition, an optical axis deviation value is read from the internal memory 30 in the image processing circuit 22 (step S105). Here, as the optical axis deviation value, the relative positional information of the optical axis of the optical system 10 and the center of the effective range of the image sensing element 20 is required. More specifically, the deviation direction and the deviation amount (distance) are required as the relative positional information. For example, as shown in FIG. 3, the center of the effective range of the image sensing element 20 may be set to the origin (0, 0) and the optical axis center may be stored as a coordinate (x0, y0).

Next, the group of correction data is read from the internal memory 30 in the image processing circuit 22 (step S106). In general, limb darkening depends upon a distance from an optical axis. Thus, the group of correction data may be stored as a table of (L, k) with a distance L from the optical axis and a correction value k as a pair. Alternatively, for example, it may be stored as an approximation function of k=f(L).

Next, N representing the number of a pixel is initialized to 1 in step S107.

Subsequently, a distance L(N) between an Nth pixel to be corrected and the optical axis is calculated (step S108). When coordinates of the pixel is represented by (x(N), y(N)) with the aforementioned center of the effective range of the image sensing element 20 (0, 0) as the origin, the distance L(N) from the center of the optical axis (x0, y0) is found by the following expression:

$$L(N)=\{(x(N)-x0)^2+(y(N)-y0)^2\}^{1/2}$$

A correction value k(L) corresponding to the distance L(N) is selected out of the group of correction data read in step S106 (step S109). Then, processing for correcting luminance by k(L) times is applied to the Nth pixel (step S110). Then, the pixel number N and the number of pixels of the image sensing element 20 are compared and, if N is smaller, N is incremented by one in step S112 and the processing returns to step S108.

The processing from steps S108 to S110 is repeated for all the pixels as described above (step S111).

Note that the luminance correction is applied to all the pixels in this embodiment. However, since limb darkening is conspicuous in a peripheral part, if luminance is corrected only for an area where light is reduced to a certain degree or less, high-speed processing can be performed and a load exerted on the image processing circuit can be reduced.

In addition, measurement of the deviation between the optical axis of the optical system 10 and the center of the effective range of the image sensing element 20 may be performed using external measurement equipment in a camera manufacturing process. Alternatively, a measurement circuit may be provided inside a camera. In any case, for example, if a chart provided with a mark in its center is sensed and a position of the mark on a sensed image is measured, deviation of an optical axis can be measured.

It should be noted that the positional deviation information includes not only deviation between the reference position of the image sensing element 20 and the reference position of the optical system 10, but also angular deviation or the like. Further, the positional deviation information includes not only measured values of physical positional deviation between the optical axis of the optical system 10 and a predetermined reference position of the image sensing element 20, but also measured values of relative deviation amount measured after sensing a predetermined reference test pattern by the image sensing apparatus after the optical system 10 and an image sensing element 20 are mounted on the image sensing element.

Figure 4:
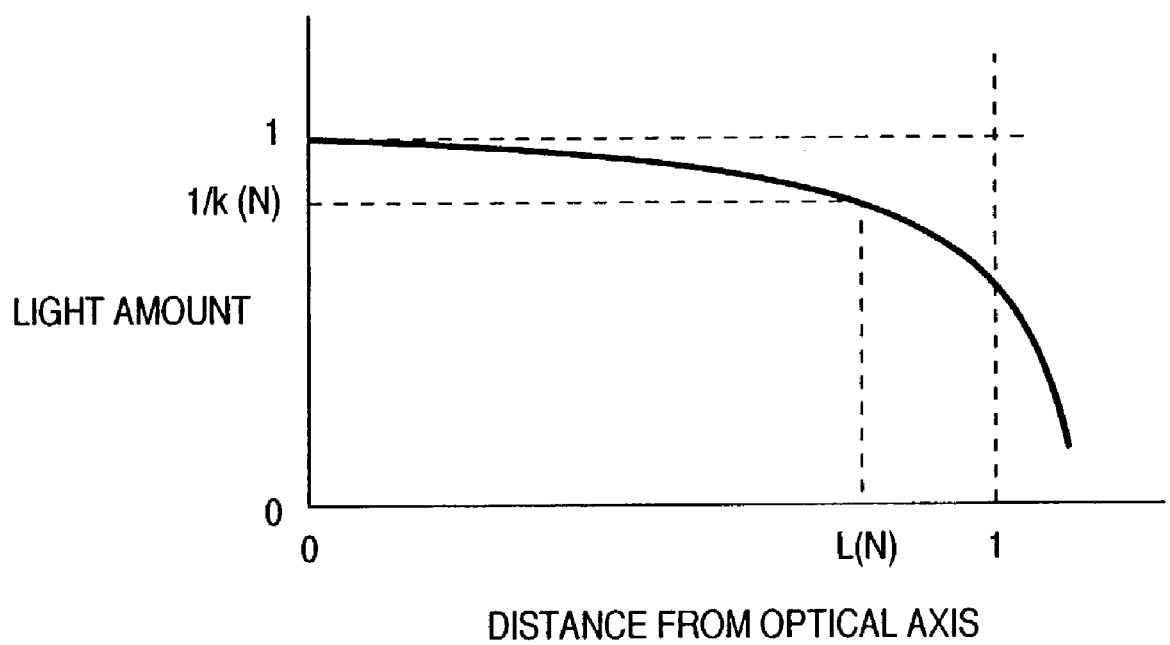
FIG. 4 is a graph schematically showing a peripheral light amount obtained through a reference lens with respect to a distance from the optical axis (image height)

In addition, the group of correction data can be calculated by sensing a plane, whose luminance is uniform, with a reference lens in which an optical axis deviation is suppressed as much as possible and measuring luminance in a peripheral part with respect to luminance in a central part of an image. FIG. 4 schematically shows a relationship between a peripheral light amount obtained by the reference lens and a distance from the optical axis (image height). For convenience' sake, both vertical and horizontal axes are normalized and, on the horizontal axis, an outermost edge of the effective range of the image sensing element 20 is represented by 1 with the center of the effective range as a zero point. In addition, on the vertical axis, luminance in the center of the effective range is assumed to be 1. Here, when a light amount at an image height L is represented by 1/k, if it is multiplied by k conversely, it can be made equal to the luminance of the center. Thus, k can be set as a correction value of the light amount. If the distance L is varied and the light amount 1/k at each distance L is found, a group of data consisting of pairs of (distance L, correction value k) can be obtained, which only has to be stored in the internal memory 30 as described above. Alternatively, a light amount curve of FIG. 4 may be replaced by an approximation function and stored.

Note that, in this embodiment, a correction value of an arbitrary pixel on a screen is obtained from a group of correction data stored in the internal memory 30 and a distance from an optical axis to a pixel calculated using a deviation amount of the optical axis. However, a group of correction data taking optical axis deviation into account in advance may be recorded in the internal memory 30. That is, by calculating correction values for all pixels while taking optical axis deviation into account and storing the calculated correction values in the internal memory 30 in advance, a correction value corresponding to a target pixel of correction has to be simply read out from the internal memory 30 to perform correction, and it is not necessary to calculate optical axis deviation at the time of correction of limb darkening. In that case, the processing of step S108 of FIG. 2 becomes unnecessary, and the correction value k(N) for the number N only has to be read out in step S109.

Note that, in the case in which it is difficult to store correction values for all pixels in terms of a storage capacity, the effective range of the image sensing element 20 may be divided into a plurality of areas and the same correction value may be used for each area to perform correction.

FIG. 5 is a graph showing a the correction value for correcting limb darkening obtained using the reference lens with respect to position on the image sensing element 20 along a line passing through the optical axis and the center of the effective range of the. As shown in FIG. 5, the group of correction data is calculated such that a minimum value of the correction values substantially coincide with a position of the optical axis.

Note that the minimum value of the correction values may not strictly coincide with the optical axis but only has to be in a position between the optical axis and the center of the effective area of the image sensing element 20 and closer to the optical axis.

In the group of correction data taking optical axis deviation into account in advance as described above, other than storing each correction value in association with each pixel, each correction value may be associated with a physical position (distance and direction) of each pixel with respect to the center of the effective range of the image sensing element and stored.

Further, in the above embodiment, the correction values are for merely correcting limb darkening due to characteristics of the optical system. However, the correction values may be synthetic correction values for correcting not only limb darkening but also variation in optical system, such as sensitivity of respective pixels, color variation in color filter, and in other causes, such as sensitivity difference in image sensing device and state of the color filter, for instance.

Furthermore, a plurality of groups of correction data having a plurality of different shading characteristics (curves) corresponding to light amounts of a subject may be stored, and an appropriate group of correction data is used on the basis of AE information from the image sensing element 20 at the time of image sensing operation. Further, a calculation circuit for generating a group of correction data having shading characteristic suitable for each image sensing operation based on AE information from the image sensing element 20 may be provided in the image processing apparatus. In such a case, the calculation circuit is included in the system control circuit 50.

The image processing apparatus may be provided within an image sensing apparatus or constituted as an external processing apparatus, such as a personal computer, provided outside of an image sensing apparatus. In the latter case, a sensed image as well as positional deviation information (stored in ROM of the image sensing apparatus, such as a digital camera) specific to the digital camera are recorded for, e.g., each image on a detachable recording medium by the image sensing apparatus. Then, at a time of attaching the recording medium to the external processing apparatus and processing the image, the external processing apparatus reproduces the image from the recording medium and corrects the image using the positional deviation information specific to the digital camera read from the recording medium. In this manner, if the recording medium is used in a plurality of digital cameras to record images sensed by different cameras, image correction suitable for the respective cameras can be performed.

Further, instead of recording the positional deviation information specific to a digital camera for each image, single positional deviation information specific to a digital camera may be recorded on each recording medium. In this case, however, there is a drawback that appropriate correction cannot be performed if the recording medium is used for recording images in different image sensing apparatuses.

OTHER EMBODIMENT

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

Figure 2:
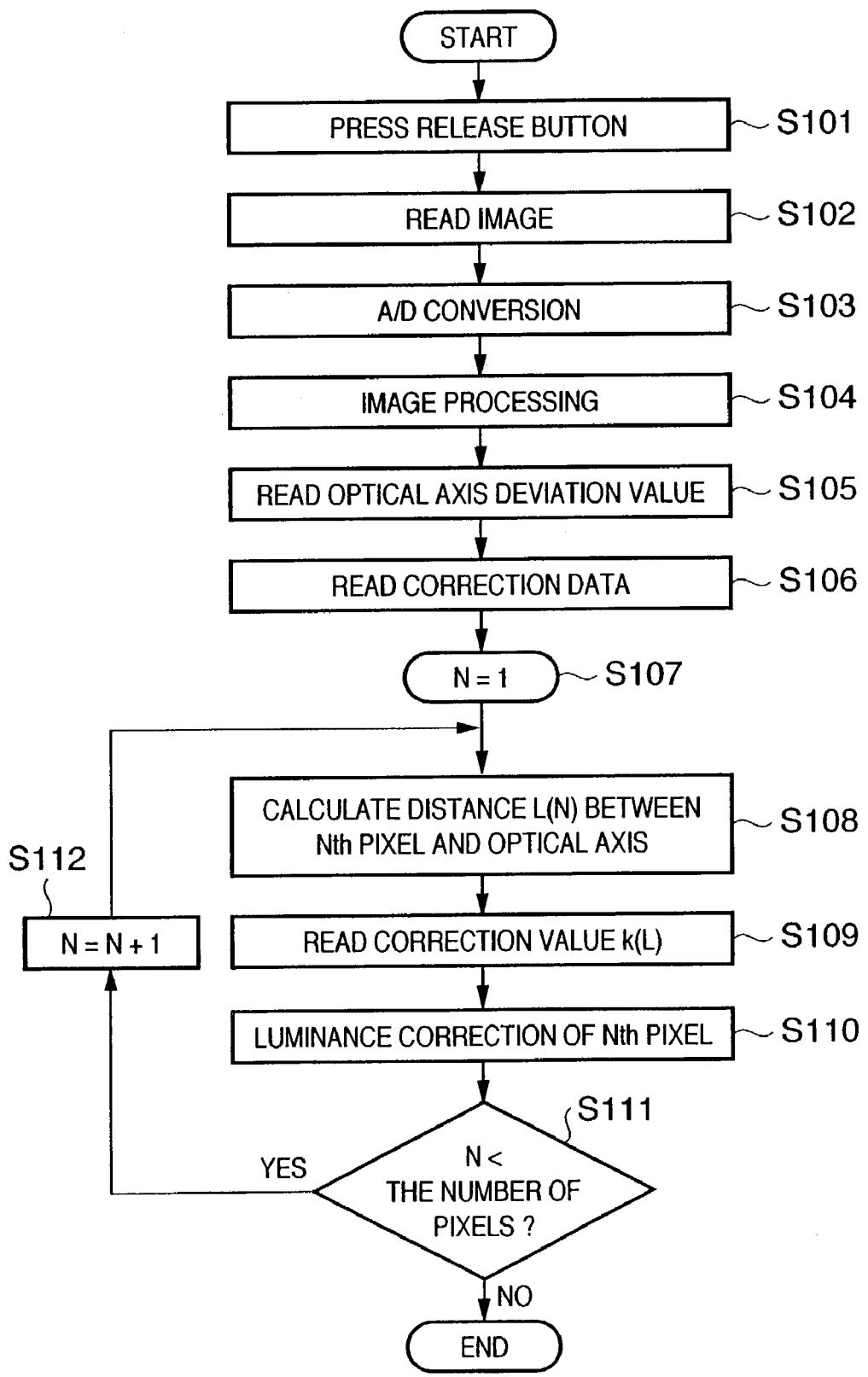
FIG. 2 is a flowchart showing a processing operation of the image sensing apparatus according to the embodiment of the present invention.

In a case where the present invention is applied to the aforesaid storage medium, the storage medium stores program codes corresponding to the flowchart shown in FIG. 2 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image processing apparatus for processing an image sensed by an image sensing unit which includes an optical system and an image sensing element for converting a subject image formed by said optical system into an electric signal, the image processing apparatus comprising:
   a storage unit adapted to store relative positional information of an optical axis of said optical system and a reference point of an effective range of said image sensing element and a function representing transmission characteristics of said optical system in advance;
   a correction value calculation unit adapted to calculate a correction value for correcting an image sensed by said image sensing unit using the relative positional information and the function; and
   an image correction unit adapted to correct the sensed image based upon the correction value.

2. The image processing apparatus according to claim 1, wherein the relative positional information is a distance and a direction from the reference point.

3. The image processing apparatus according to claim 1, wherein the correction is luminance correction for each pixel.

4. The image processing apparatus according to claim 3, wherein the luminance correction is applied to all pixels.

5. The image processing apparatus according to claim 3, wherein the luminance correction is applied to a part of pixels.

6. An image processing apparatus for processing an image sensed by an image sensing unit which includes an optical system and an image sensing element for converting a subject image formed by said optical system into an electric signal, the image processing apparatus comprising:
   a storage unit adapted to store in advance a group of correction data, which is calculated on the basis of relative positional information of an optical axis of said optical system and a reference point of an effective range of said image sensing element, for correcting an image sensed by said image sensing unit; and
   an image correction unit adapted to correct the sensed image based upon the group of correction data.

7. The image processing apparatus according to claim 6, wherein a minimum value of the group of correction data is associated with a position substantially coinciding with the optical axis position on said image sensing element.

8. The image processing apparatus according to claim 6, wherein a minimum value of the group of correction data is associated with a position between the optical axis of said optical system and the reference point and closer to the optical axis.

9. The image processing apparatus according to claim 6, wherein the relative positional information is a distance and a direction from the reference point.

10. The image processing apparatus according to claim 6, wherein the correction is luminance correction for each pixel.

11. The image processing apparatus according to claim 10, wherein the luminance correction is applied to all pixels.

12. The image processing apparatus according to claim 10, wherein the luminance correction is applied to a part of pixels.

13. An image sensing apparatus comprising:
   an image sensing unit including an optical system and an image sensing element for converting a subject image formed by said optical system into an electric signal; and the image processing apparatus according to claim 1.

14. An image sensing apparatus comprising:
   an image sensing unit including an optical system and an image sensing element for converting a subject image formed by said optical system into an electric signal; and
   the image processing apparatus according to claim 6.

15. An image processing method for processing an image sensed by an image sensing unit which includes an optical system and an image sensing element for converting a subject image formed by said optical system into an electric signal, the image processing method comprising:
   reading relative positional information of an optical axis of said optical system and a reference point of an effective range of said image sensing element and a function representing transmission characteristics of said optical system from a storage unit;
   calculating a correction value for correcting an image sensed by said image sensing unit using the read relative positional information and the function; and
   correcting the image sensed by said image sensing unit based upon the correction value.

16. An image processing method for processing an image sensed by an image sensing unit which includes an optical system and an image sensing element for converting a subject image formed by said optical system into an electric signal, the image processing method comprising:
   reading out a group of correction data, which is calculated on the basis of relative positional information of an optical axis of said optical system and a reference point of an effective range of said image sensing element, for correcting an image sensed by said image sensing unit from a storage unit; and
   correcting the image based upon the group of correction data read out from said storage unit.

17. The image processing method according to claim 16, wherein a minimum value of the group of correction data is associated with a position substantially coinciding with the optical axis position on said image sensing element.

18. The image processing method according to claim 16, wherein a minimum value of the group of correction data is associated with a position between the optical axis of said optical system and the reference point and closer to the optical axis.

19. A storage medium readable by a data processing apparatus, said storage storing a program which is executable by the data processing apparatus and comprises program codes realizing the image processing method described in claim 15.

20. A storage medium readable by a data processing apparatus, said storage storing a program which is executable by the data processing apparatus and comprises program codes realizing the image processing method described in claim 16.

21. An image processing apparatus for processing an image sensed by an image sensing unit which includes an optical system and an image sensing element for converting a subject image formed by said optical system into an electric signal, the image processing apparatus comprising:
   an acquisition unit adapted to acquire positional deviation information in a manufacturing process between said optical system and said image sensing element;
   a storage unit adapted to store image correction values in advance; and
   an image correction unit adapted to correct the image based upon said positional deviation information in a manufacturing process and said image correction value.

22. The image processing apparatus according to claim 21, wherein said image correction unit corrects said image correction values based on said positional deviation information, then corrects the sensed image.

23. The image processing apparatus according to claim 21, wherein said image correction unit reads a predetermined image correction value from said storage unit on the basis of said positional deviation information, then corrects the sensed image.

24. An image processing apparatus for processing an image sensed by an image sensing unit which includes an optical system and an image sensing element for converting a subject image formed by said optical system into an electric signal, the image processing apparatus comprising:
   a storage unit adapted to store correction values for correcting an image sensed by said image sensing unit calculated on the basis of positional deviation information in a manufacturing process between said optical system and said image sensing element; and
   an image correction unit adapted to correct the sensed image based upon the correction values.

25. The image processing apparatus according to claim 24, wherein a position corresponding to a minimum value of the correction values in an effective range of said image sensing element is off the center of the effective range.

26. An image processing apparatus for processing an image sensed by an image sensing unit which includes an optical system and an image sensing element for converting a subject image formed by said optical system into an electric signal, the image processing apparatus comprising:

a storage unit adapted to store a first group of correction data for correcting an image sensed by said image sensing unit on the basis of positional deviation information in a manufacturing process between said optical system and said image sensing element; and a calculation unit adapted to calculate a plurality of second groups of correction data corresponding to a light amount of a object at a time of image sensing operation using said first group of correction data, wherein a position corresponding to a minimum value of said first group of correction data in an effective range of said image sensing element is off the center of the effective range.

27. An image processing method for processing an image sensed by an image sensing unit which includes an optical system and an image sensing element for converting a subject image formed by said optical system into an electric signal, the image processing method comprising:

acquiring positional deviation information in a manufacturing process between said optical system and said image sensing element;

storing image correction values in advance; and correcting the image based upon said positional deviation information in a manufacturing process and said image correction values.

28. The image processing method according to claim 27, wherein said image correction values are corrected based on said positional deviation information, then an image sensed by said image sensing unit is corrected.

29. The image processing method according to claim 27, wherein a predetermined image correction value is read from said storage unit on the basis of said positional deviation information, then an image sensed by said image sensing unit is corrected.

30. A storage medium readable by a data processing apparatus, said storage storing a program which is executable by the data processing apparatus and comprises program codes realizing the image processing method described in claim 27.

* * * * *

UNITED STATES PATENT AND TRADEMARK OFFICE
CERTIFICATE OF CORRECTION

PATENT NO. : 7,190,845 B2 Page 1 of 1
APPLICATION NO. : 10/395361
DATED : March 13, 2007
INVENTOR(S) : Seiji Iida It is certified that error appears in the above-identified patent and that said Letters Patent is hereby corrected as shown below:

Claim 26
Column 11, line 11, before "object" "a" should be changed to --an--.

Signed and Sealed this

Fifteenth Day of May, 2007

JON W. DUDAS
*Director of the United States Patent and Trademark Office*